July 24, 1928.
P. A. ROBBINS
1,677,990
SPEEDOMETER
Filed Dec. 13, 1926
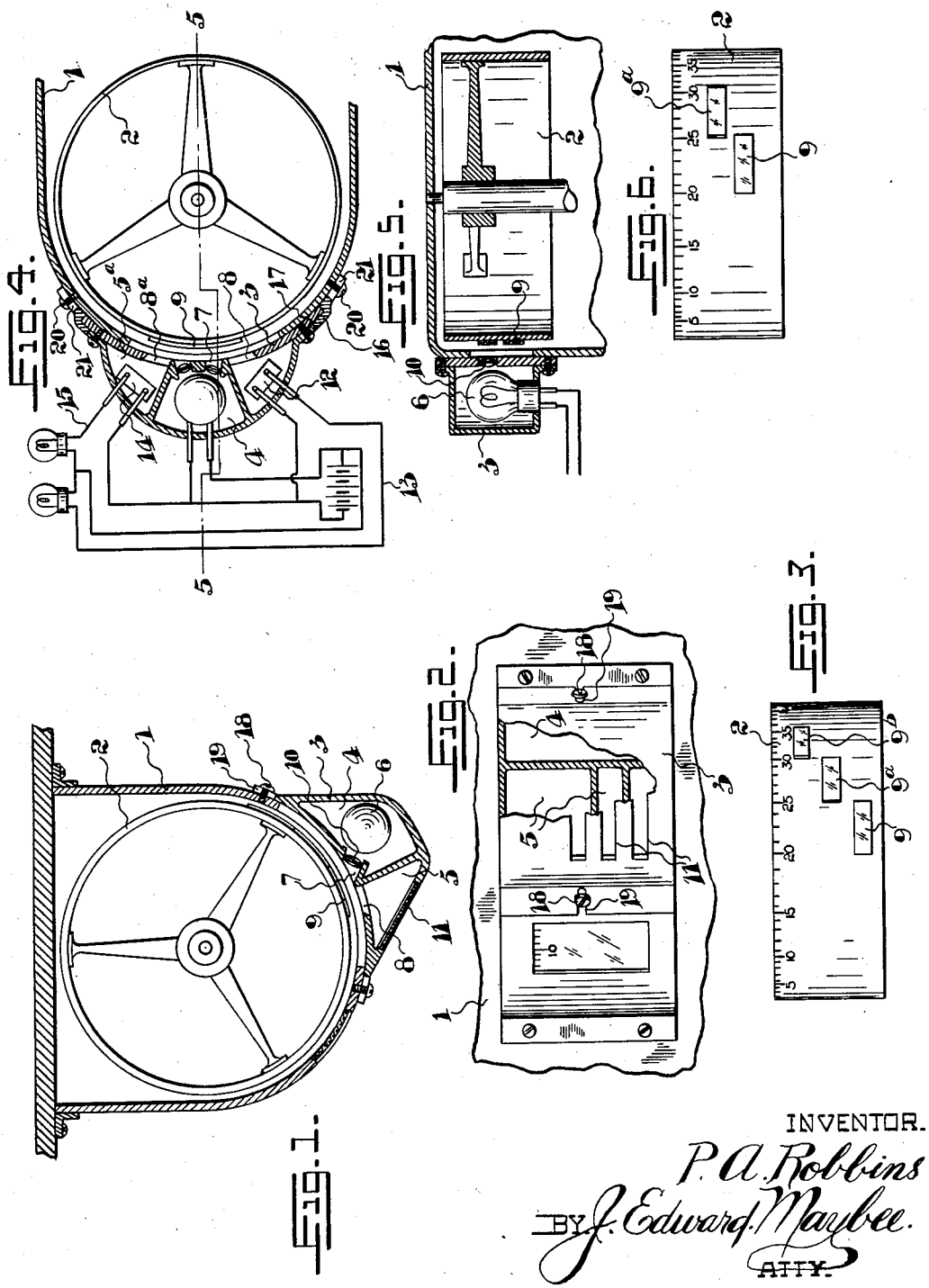
INVENTOR.
P. A. Robbins
BY J. Edward Maybee.
ATTY.

Patented July 24, 1928.

1,677,990

UNITED STATES PATENT OFFICE.

PERCY A. ROBBINS, OF HIGHLAND PARK, ILLINOIS.

SPEEDOMETER.

Application filed December 13, 1926. Serial No. 154,581.

This invention relates to devices used for indicating the speed of a vehicle, and my object is to devise a speedometer which will not only give the usual indication of the speed of the vehicle but will also give a special warning when a given speed is exceeded.

I attain my object by means of a construction which may be briefly described as follows. To part of the speedometer, which is rotated to indicate the speed, is secured a mirror of segmento-cylindrical form. In the speedometer casing is formed a chamber enclosing a source of light, such as an electric lamp, and provided with a window between the source of light and the path of the mirror. A second window is formed in the speedometer casing outside the lamp chamber through which light from the lamp chamber striking the mirror may be reflected. The light reflected through the casing window may be used either directly or indirectly to give a warning. For instance, it may be directed so as to illuminate a warning device adjacent the instrument, or it may be used to give a signal at any desired distant position by causing it to impinge on a selenium cell included in an electric alarm circuit, thus reducing the resistance of the circuit and causing the operation of the signal. Except where the mirrors are located, the surface of the rotatable drum of the speedometer is so covered and colored that the reflection of light therefrom is a minimum.

The invention is hereinafter more specifically described and is illustrated in the accompanying drawings in which Fig. 1 is a horizontal section of the speedometer constructed in accordance with my arrangement;

Fig. 2 is a front elevation of the same;

Fig. 3 a front elevation of the rotatable drum of the speedometer;

Fig. 4 a horizontal section of a modification of the same;

Fig. 5 a vertical section of the same on a line 5—5 in Fig. 4; and

Fig. 6 a front elevation of the rotatable drum of the speedometer.

In the drawings like numerals of reference indicate corresponding parts in the different figures.

1 is the casing of a speedometer which may be of any ordinary type, and in which is mounted a rotatable speed indicating member 2 which is shown as of the ordinary drum type, though any member adapted to take up an angular position corresponding to the speed of the vehicle may serve the purpose of my invention.

Exterior of the casing 1, I secure a casing 3 in which are formed two chambers 4 and 5. The chamber 4 may be termed the lamp chamber as it is adapted to contain an electric bulb 6 or other suitable source of light. The chamber 5 may be termed the signal chamber. In the casing 1, which forms the inner wall of the chamber 4, is formed a window 7. A second window 8 is formed in the wall of the signal chamber 5.

Positioned on the rotary member 2 is a mirror 9 of segmento-cylindrical form and mounted concentric with the axis of the said member. When this mirror, by the rotation of the member 2, is brought to a suitable position, light passing through the window 7 is reflected from the mirror through the window 8 into the chamber 5. Preferably a lens 10 is fitted into the window 8 to focus the light of the lamp 6 on to the surface of the mirror. The mirror is positioned on the periphery of the drum to correspond with a given speed or range of speeds indicated by the rotary member. Consequently, the signal chamber will be illuminated the moment a given speed is exceeded. Preferably the mirror is of such a length that the warning is continuous through a predetermined range of speeds above the minimum for which it is set so that a warning signal is given as long as the vehicle on which the speedometer is used is exceeding the maximum pre-determined speed. Where the light falls upon the surface of the rotary member 2 away from that portion covered by the mirror, the surface is covered by some suitable light absorbing medium such as black felt or black pigment.

As the regulations for safe driving vary in different localities, it is desirable to give different signals indicating when the vehicle is exceeding any one of several speeds. It is also preferable that any excess over the lowest speed is to be indicated shall cause the signal indicating the exceeding of such speed to continue visible substantially to the time of operation of the signal indicating that the next pre-determined speed has been exceeded, and so forth. I therefore provide the rotary member 2 with a plurality of mirrors of segmento-cylindrical form as indicated at 9, 9ª, 9ᵇ (see Fig. 3). These are positioned preferably in different positions, spaced axially of the rotary member 2. A plurality of signal chambers are also provided, as shown. The mirror 9ª serves to indicate speeds from twenty to twenty-five miles an hour, the mirror 9 speeds from twenty-four and a half to thirty miles an hour and the mirror 9ᵇ speeds above twenty-nine and a half miles an hour. Any other desired arrangement is, of course, possible to suit legal requirements.

The light reflected into the signal chamber may be utilized in several different ways to give a warning signal. In Figs. 1 and 2 I show each signal chamber formed with a window 11. These windows for easy differentiation are preferably glazed with transparent media of different colors so that the eye may distinguish one signal from another by color as well as by position.

In Figs. 4, 5 and 6 I show a modification of the means for utilizing the light to give a warning signal. Instead of employing a window in the external wall of the signal chamber to utilize the light to give a warning signal, the signal chamber is entirely closed except for the window 8 through which light may be reflected from the mirror 9, and in the chamber is located a selenium cell 12 included in a visual or audible alarm circuit 13 of known type. The resistance of the selenium cell is reduced, when the light impinges upon it, and consequently a visual or audible alarm will be given as in the construction previously described. The advantage of this is, of course, that a visual or audible signal can be given at a position remote from the speedometer itself and where it is certain to reach the eye or ear of the driver. As in the construction previously described, the mirror 9 may be made of sufficient length to give a visual or audible warning over a range of different speeds above a pre-determined maximum.

To give a warning over a second range of speeds, a second signal chamber 5ª may be employed in line with the first provided with a window 8ª. This chamber contains a selenium cell 14 included in a second visual or audible alarm circuit 15.

It is desirable to have the device quickly adjustable according as the driver is operating in a town or country. For instance, in town he may desire an indication of speeds from fifteen to twenty and from twenty to twenty-five miles an hour, while in the country he may require indications of speeds between thirty to thirty-five and from thirty-five to forty or over. To provide for this I preferably employ a plurality of mirrors on the rotatable member 2, as shown in Fig. 6, and arrange the casing 3 to slide on the casing 1 parallel to the axis of the rotary member 2. For this purpose I show the casing 1 as provided with guides 16 in which the flanges 17 of the casing 3 are slidable. The casing 3 will usually retain the position to which it is moved by friction, though clamping means may be provided if necessary.

It will be seen that, with either form of the device described, warning signals may be given to indicate the moment the vehicle has exceeded a certain pre-determined maximum speed, and that the warning will be continued through a range of speeds sufficiently beyond the maximum to ensure that the driver will not be misled into thinking that he has dropped below the maximum when in fact he has exceeded it. The device is also arranged so that it is useful under different speed limit requirements.

To aid in the correct setting of the device it is desirable that the lamp chamber and signal chamber should be adjustable within small limits circumferentially of the member 2. For this purpose I show in Fig. 2 the casing 3 as secured to the casing 1 by means of screws 18 passing through slots 19 in the casing 3. In Fig. 4 I show the flanges 17 secured to the casing 1 by means of screws 20 passing through slots 21 in the flanges.

I have described two methods of utilizing the light received in the signal chambers to give signals, but it is evident, of course, that others might be devised which would fall within the scope of my invention.

What I claim is:

1. A speedometer having a part rotatable to indicate speed; a segmento-cylindrical mirror mounted on said part concentric with its axis; a lamp; a wall separating the lamp from the said part and provided with a window through which light may shine on the mirror when the latter is brought to a suitable position by the movement of said rotatable part; a second window through which light passing through the first window to the mirror is reflected; and means for utilizing light so reflected to give a warning signal.

2. A speedometer having a part rotatable to indicate speed; a segmento-cylindrical mirror mounted on said part concentric with its axis; a lamp; and means for utilizing light to give a warning signal, the apparatus being arranged so that when the mirror is moved to a given position by the movement of the rotatable part light is reflected to the signal means.

3. A speedometer constructed as set forth in claim 2 in which means are provided to vary the position of the lamp and light utilizing means in a direction parallel to the axis of the rotating part and the latter is provided with a plurality of mirrors differently spaced both circumferentially and axially of the rotatable part, whereby the lamp and light utilizing means may be positioned for co-operation with any desired mirror.

4. A speedometer constructed as set forth in claim 2 in which two independent means for utilizing light to give a warning signal are employed positioned to give indications seriatim as the mirror is moved by the rotatable part.

5. A speedometer constructed as set forth in claim 2 in which two independent means for utilizing light to give a warning signal are employed positioned to give indications seriatim as the mirror is moved by the rotatable part and in which means are provided to vary the position of the lamp and light utilizing means in a direction parallel to the axis of the rotating part and the latter is provided with a plurality of mirrors differently spaced both circumferentially and axially of the rotatable part, whereby the lamp and light utilizing means may be positioned for co-operation with any desired mirror.

6. A speedometer having a part rotatable to indicate speed; a segmento-cylindrical mirror mounted on said part concentric with its axis; a lamp; a wall separating the lamp from the said part and provided with a window through which light may shine on the mirror when the latter is brought to a suitable position by the movement of said rotatable part; a second chamber adjacent the first also provided with a window through which light passing through the first window to the mirror is reflected; and means associated with the said second chamber for utilizing the light received to give a warning indication.

7. A speedometer of drum like form having a light absorbing external periphery; a segmento-cylindrical mirror mounted on said periphery; a lamp; and means for utilizing light to give a warning signal, the apparatus being arranged so that when the mirror is moved past a given position by the movement of the rotatable part light is reflected to the signal means throughout a predetermined arc of movement of the drum corresponding to the arc subtended by the mirror.

8. A speedometer constructed as set forth in claim 2 in which means are provided to adjust the position of the lamp and light utilizing means transversely of the axis of the rotating part.

Signed at Highland Park, Ill., this 18th day of November, 1926.

PERCY A. ROBBINS.